United States Patent
Goh et al.

(12) 
(10) Patent No.: US 11,009,973 B1
(45) Date of Patent: May 18, 2021

(54) DUAL SPIN SPEED FOR MOUSE SCROLL WHEEL

(71) Applicant: Dell Products L.P., Round Rock, TX (US)

(72) Inventors: Peng Lip Goh, Singapore (SG); Eng Kang Chng, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/029,528

(22) Filed: Sep. 23, 2020

(51) Int. Cl.
*G06F 3/0354* (2013.01)

(52) U.S. Cl.
CPC .................. *G06F 3/03544* (2013.01)

(58) Field of Classification Search
CPC ... G06F 3/0344; G06F 3/0362; G06F 3/03544
USPC .......................................................... 345/163
See application file for complete search history.

(56) References Cited

U.S. PATENT DOCUMENTS

| | | | | |
|---|---|---|---|---|
| 6,686,903 B1 * | 2/2004 | Peng | .................. | G06F 1/26 345/163 |
| 6,956,558 B1 * | 10/2005 | Rosenberg | .............. | G06F 3/016 345/156 |
| 9,990,058 B2 * | 6/2018 | Hadas | .................. | G06F 3/03543 |
| 2011/0227828 A1 * | 9/2011 | Blandin | .............. | G06F 3/03543 345/163 |
| 2017/0285768 A1 * | 10/2017 | Bruwer | .................. | G06F 3/0362 |

\* cited by examiner

*Primary Examiner* — Calvin C Ma
(74) *Attorney, Agent, or Firm* — Jackson Walker L.L.P.

(57) ABSTRACT

A mouse configured to communicatively couple to an information handling system may include an enclosure, a scroll wheel enclosed within the enclosure, with a portion of the scroll wheel extending from the enclosure, the scroll wheel configured to rotate about a first rotational axis, a scroll wheel gear mechanically coupled to the scroll wheel and configured to rotate about the first rotational axis at the same angular velocity as the scroll wheel, and a damping gear assembly. The damping gear assembly may include a damping gear enclosed with the enclosure and configured to rotate about a second rotational axis parallel to the first rotational axis of the scroll wheel and a slider enclosed within the enclosure and exposed through an opening of the enclosure proximate to the portion of the scroll wheel which is exposed through the enclosure, the slider mechanically coupled to the damping gear to enable a user to selectively engage the damping gear to the scroll wheel gear and selectively disengage the damping gear from the scroll wheel gear by interacting with the slider, such that the damping gear inhibits rotation of the scroll wheel when the damping gear is engaged with the scroll wheel gear and such that the scroll wheel rotates freely when the damping gear is disengaged from the scroll wheel gear.

14 Claims, 4 Drawing Sheets

DUAL SPIN SPEED FOR MOUSE SCROLL WHEEL

TECHNICAL FIELD

The present disclosure relates in general to information handling systems, and more particularly to a systems and methods for implementing a mouse having a scroll wheel with two spin speeds.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include or be communicatively coupled to a mouse. A mouse is a hand-held pointing device that detects two-dimensional motion relative to a surface. This motion is typically translated into the motion of a pointer on a display, which allows a smooth control of the graphical user interface of a computer. In addition to moving a cursor, a mouse may have one or more buttons to allow operations such as selection of a menu item on a display. Mice often also feature other elements, such as touch surfaces and scroll wheels, which enable additional control and dimensional input.

A scroll wheel is a wheel used for scrolling, and may also be referred to as a mouse wheel. It is often made of hard plastic with a rubbery surface, and on a mouse is usually located between the left and right mouse buttons and is positioned perpendicular to the mouse surface. Most often, rolling the upper side of the wheel away from a user body is to scroll "upward" or "forward", and the reverse direction is to scroll "downward" or "backward." In a graphical user interface, the "upward" motion moves contents of the window downward (and the scrollbar thumb, if present, upward), and vice versa. In other configurations (sometimes called "natural scrolling") the effect is inverted.

A user working in a lengthy document may tend to scroll throughout the document. A traditional 24-step mouse allows a user's finger to turn the scroll wheel from start until end of the wheel in about four to eight steps prior to lifting the user's finger to repeat the same motion. This may be tiring or cumbersome for a user that desires to scroll through long documents.

SUMMARY

In accordance with the teachings of the present disclosure, the disadvantages and problems associated with traditional mouse scroll wheels may be reduced or eliminated.

In accordance with embodiments of the present disclosure, a mouse configured to communicatively couple to an information handling system may include an enclosure, a scroll wheel enclosed within the enclosure, with a portion of the scroll wheel extending from the enclosure, the scroll wheel configured to rotate about a first rotational axis, a scroll wheel gear mechanically coupled to the scroll wheel and configured to rotate about the first rotational axis at the same angular velocity as the scroll wheel, and a damping gear assembly. The damping gear assembly may include a damping gear enclosed with the enclosure and configured to rotate about a second rotational axis parallel to the first rotational axis of the scroll wheel and a slider enclosed within the enclosure and exposed through an opening of the enclosure proximate to the portion of the scroll wheel which is exposed through the enclosure, the slider mechanically coupled to the damping gear to enable a user to selectively engage the damping gear to the scroll wheel gear and selectively disengage the damping gear from the scroll wheel gear by interacting with the slider, such that the damping gear inhibits rotation of the scroll wheel when the damping gear is engaged with the scroll wheel gear and such that the scroll wheel rotates freely when the damping gear is disengaged from the scroll wheel gear.

A method may include enclosing a scroll wheel within an enclosure of a mouse, with a portion of the scroll wheel extending from the enclosure and the scroll wheel configured to rotate about a first rotational axis. The method may also include mechanically coupling a scroll wheel gear to the scroll wheel and configured to rotate about the first rotational axis at the same angular velocity as the scroll wheel. The method may further include enclosing a damping gear assembly within the enclosure, the damping gear assembly comprising a damping gear enclosed with the enclosure and configured to rotate about a second rotational axis parallel to the first rotational axis of the scroll wheel and a slider enclosed within the enclosure and exposed through an opening of the enclosure proximate to the portion of the scroll wheel which is exposed through the enclosure, the slider mechanically coupled to the damping gear to enable a user to selectively engage the damping gear to the scroll wheel gear and selectively disengage the damping gear from the scroll wheel gear by interacting with the slider, such that the damping gear inhibits rotation of the scroll wheel when the damping gear is engaged with the scroll wheel gear and such that the scroll wheel rotates freely when the damping gear is disengaged from the scroll wheel gear.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
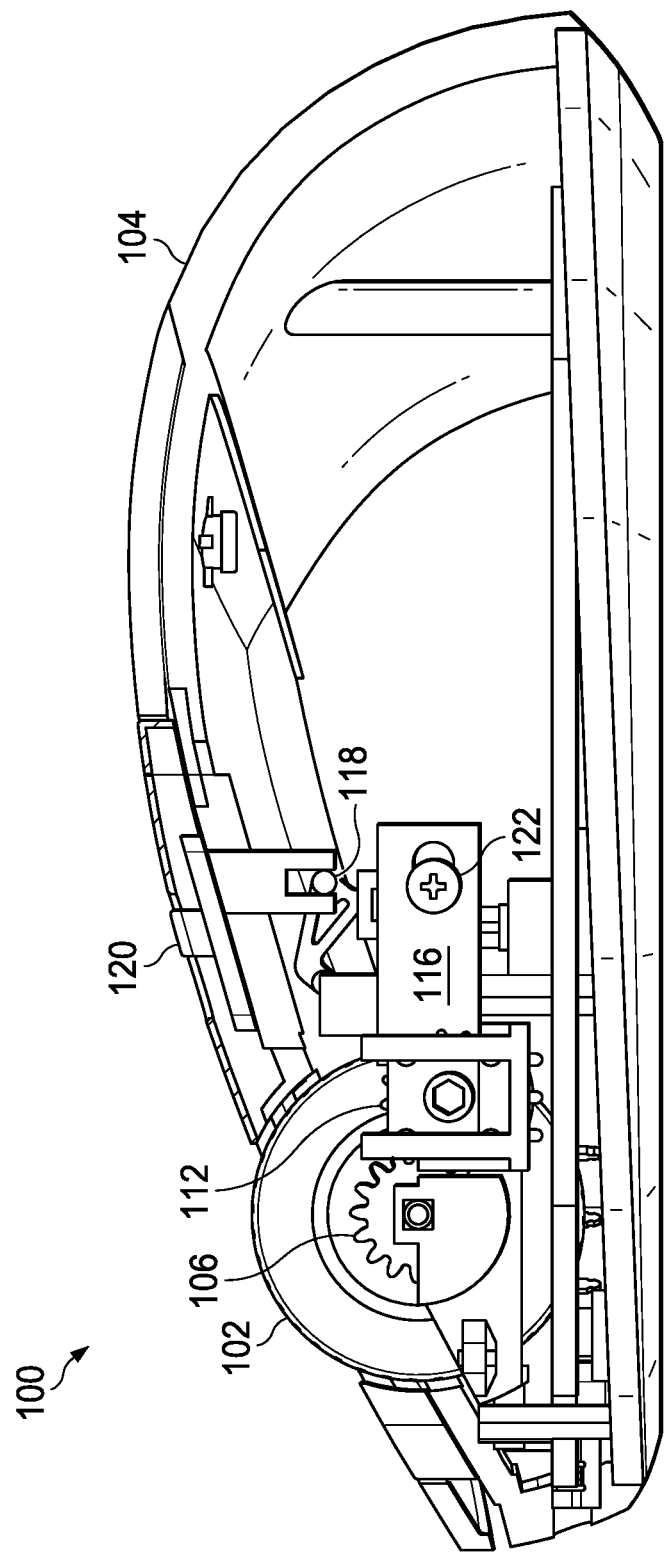
FIG. 1 illustrates a cross-sectional side elevation view of a mouse, in accordance with embodiments of the present disclosure.
Figure 2:
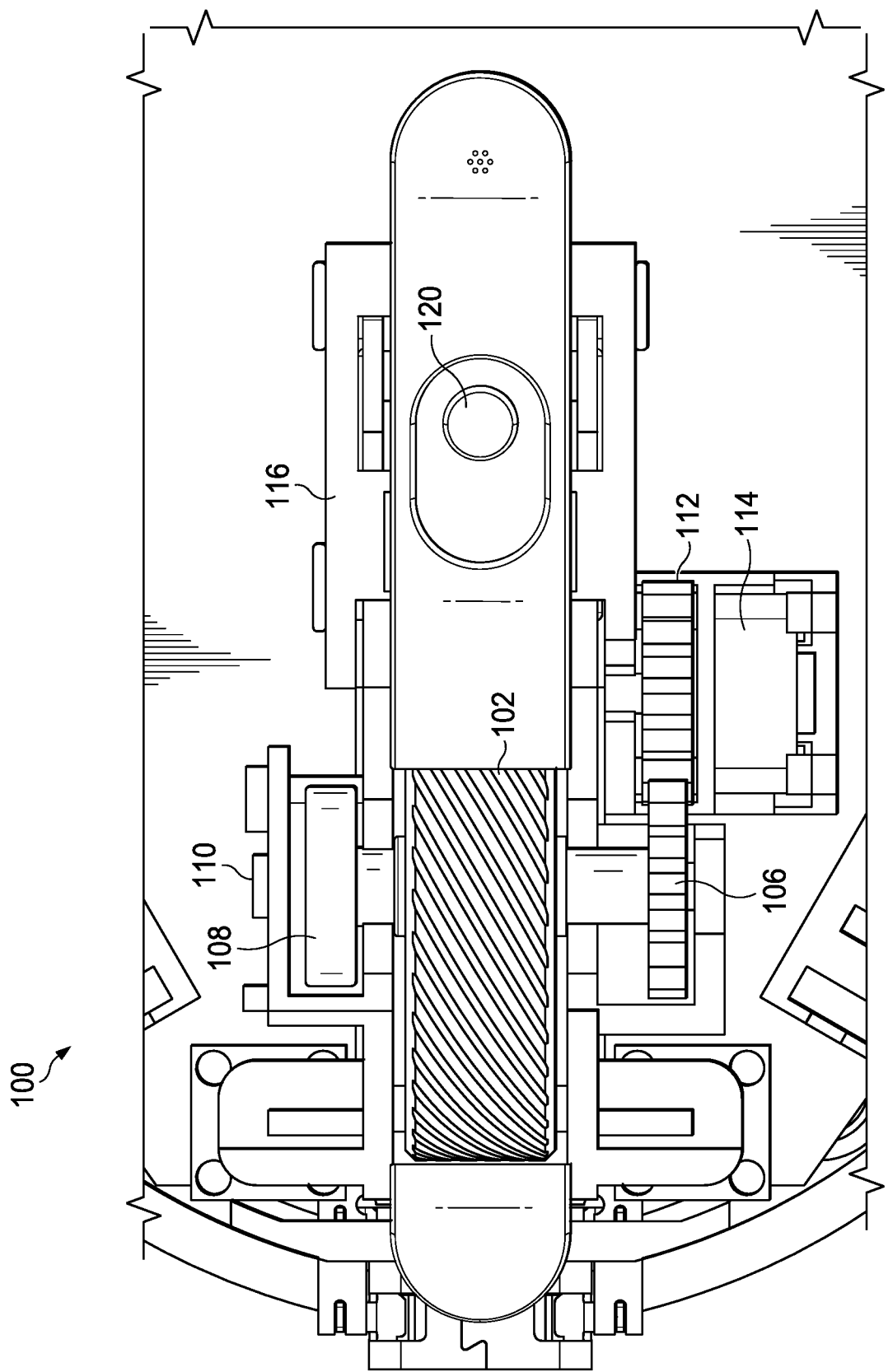
FIG. 2 illustrates a cross-sectional plan view of the mouse depicted in FIG. 1, in accordance with embodiments of the present disclosure.
Figure 3:
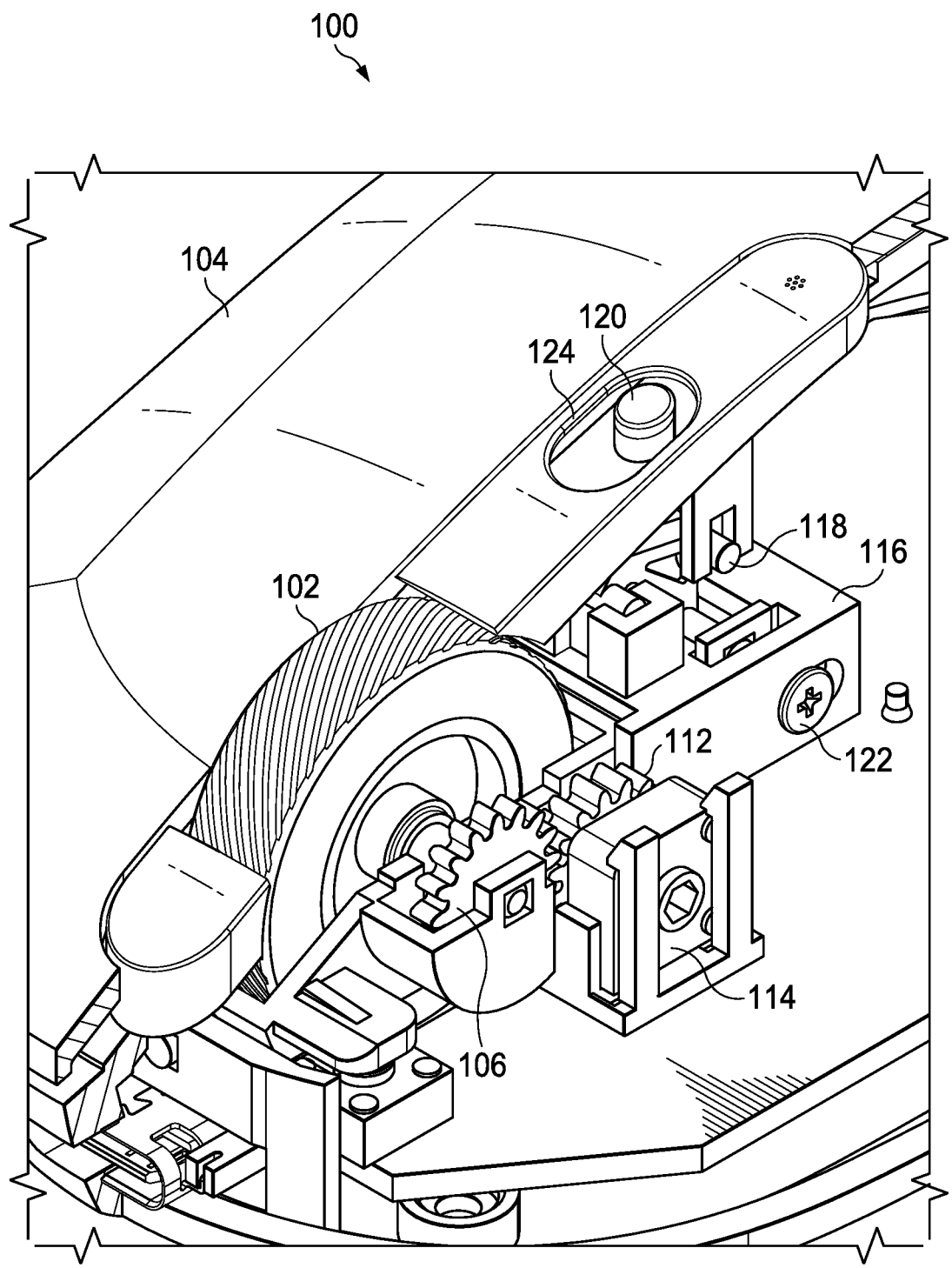
FIG. 3 illustrates a cut-away isometric view from above and to the right of the mouse depicted in FIGS. 1 and 2, in accordance with embodiments of the present disclosure.
Figure 4:
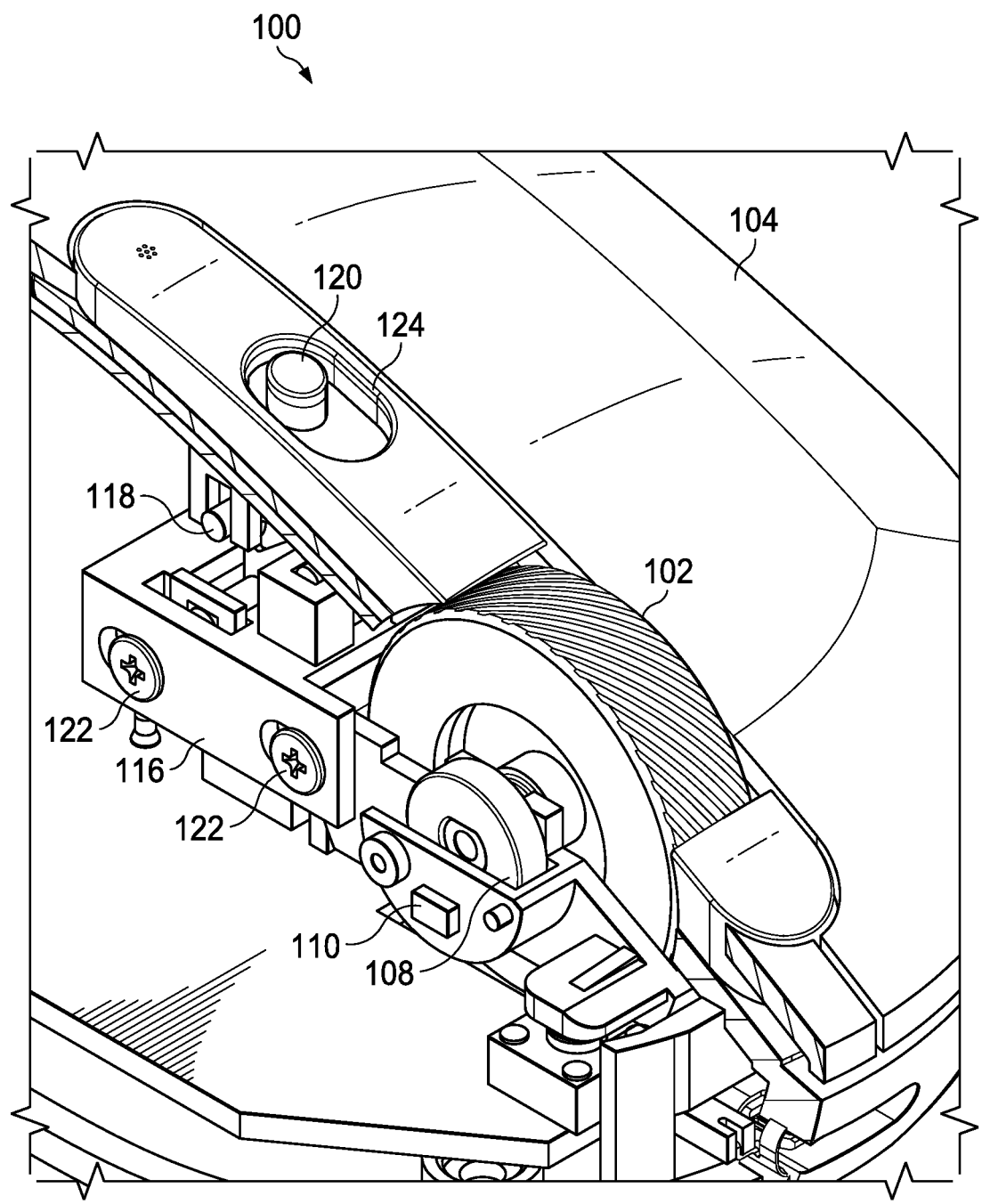
FIG. 4 illustrates a cut-away isometric view from above and to the left of the mouse depicted in FIGS. 1 through 3, in accordance with embodiments of the present disclosure.

FIG. 1 illustrates a cross-sectional side elevation view of a mouse 100, in accordance with embodiments of the present disclosure. FIG. 2 illustrates a cross-sectional plan view of mouse 100, in accordance with embodiments of the present disclosure. FIG. 3 illustrates a cut-away isometric view from above and to the right of mouse 100, in accordance with embodiments of the present disclosure. FIG. 4 illustrates a cut-away isometric view from above and to the left of mouse 100, in accordance with embodiments of the present disclosure.

Mouse 100 may comprise a hand-held pointing device that detects two-dimensional motion relative to a surface. Mouse 100 may be communicatively coupled to an information handling system, such that this two-dimensional motion may be translated into the motion of a pointer on a display integral to or communicatively coupled to the information handling system.

As shown in the FIGURES, mouse 100 may include a scroll wheel 102, which may also be referred to as a "mouse wheel." Most of scroll wheel 102 may be enclosed within an enclosure 104 of mouse 100, with a portion of scroll wheel 102 extending from enclosure 104. Scroll wheel 102 may be generally circular in shape, and may rotate about an axis that is fixed relative to enclosure 104. A user may interact with scroll wheel 102 by applying force to an edge of scroll wheel 102 to cause scroll wheel 102 to rotate about its axis, and, as described in greater detail below, such rotation may be translated into scrolling (e.g., scrolling up and down in a document) on a display integral to or communicatively coupled to an information handling system to which mouse 100 is communicatively coupled.

As also shown in the FIGURES, scroll wheel 102 may be mechanically coupled to a scroll wheel gear 106 that shares a rotational axis of scroll wheel 102 such that scroll wheel gear 106 rotates at the same angular velocity as scroll wheel 102. Further, as shown in the FIGURES, scroll wheel 102 may be mechanically coupled to a rotating magnet 108 that shares a rotational axis of scroll wheel 102 such that rotating magnet 108 rotates at the same angular velocity as scroll wheel 102.

As also depicted in the FIGURES, mouse 100 may include a magnetometer 110 (e.g., a Hall effect sensor) placed in proximity to rotating magnet 108 configured to sense rotation of rotating magnet 108 and configured to generate an electrical or electronic signal indicative of a rotational displacement of rotating magnet 108. Accordingly, the combination of rotating magnet 108 and magnetometer 110 may allow for mechanically contactless encoding of the rotational motion of rotating magnet 108, such that rotational motion of rotating magnet 108 may be translated into signals indicative of desired scrolling on a display integral to or coupled to an information handling system to which mouse 100 is communicatively coupled.

As further depicted in the FIGURES, mouse 100 may include a damping gear assembly comprising a damping gear 112, a mechanical encoder 114 mechanically coupled to damping gear 112, a gear box 116 mechanically coupled to damping gear 112, a link bar 118 mechanically coupled to gear box 116, and a slider 120 mechanically coupled to link bar 118.

Damping gear 112 may rotate about an axis that is fixed relative to gear box 116, such that the rotational axis of damping gear 112 is parallel to the rotational axis of scroll wheel 102.

Gear box 116 may be mechanically coupled to damping gear 112 and may further be mechanically coupled to the remainder of mouse 110 (e.g., via bearings 122) such that gear box 116 may slide in a linear direction relative to scroll wheel 102 in a direction perpendicular to the rotational axis of scroll wheel 102. Accordingly, such linear mechanical translation of gear box 116 may cause a similar linear translation of damping gear 112 relative to scroll wheel gear 106, such that damping gear 112 may be translated between a first position in which damping gear 112 mechanically engages with scroll wheel gear 106, and a second position in which damping gear 112 mechanically disengages with scroll wheel gear 106.

Gear box 116 may be mechanically coupled to link bar 118 which is in turn mechanically coupled to slider 120, such that gear box 116 is fixed relative to slider 120, but mechanical translation of slider 120 in a linear direction causes a corresponding linear translation of gear box 116. As shown in the FIGS. 3 and 4, while the bulk of slider 120 may be contained within enclosure 104, a portion of slider 120 may be exposed via an opening 124 formed in enclosure 104 proximate to scroll wheel 102. A user may interact with such exposed portion of slider 120 to slide slider 120 in a linear direction parallel to the linear direction in which gear box 116 is configured to slide, thus allowing the user to selectively slide damping gear 112 between the first position and the second position, and vice versa. Accordingly, via slider 120, a user may selectively engage and disengage damping gear 112 and scroll wheel gear 106.

Mechanical encoder 114 may be mechanically coupled to damping gear 112 and configured to provide mechanical resistance to the rotation of damping gear 112. Furthermore, when damping gear 112 is engaged with scroll wheel gear 106, mechanical encoder 114 may, via damping gear 112 and scroll wheel gear 106, provide tactile feedback to scroll wheel 102 (e.g., to provide to a user via scroll wheel 102 a 24-step count tactile feeling of a traditional mouse). Thus, when damping gear 112 is engaged with scroll wheel gear 106, the speed at which a user is able to spin scroll wheel 102 is damped by damping gear 112 and mechanical encoder 114.

On the other hand, when damping gear 112 is disengaged from scroll wheel gear 106, the speed at which a user is able to spin scroll wheel 102 is not inhibited by damping gear 112 and mechanical encoder 114, allowing scroll wheel gear 106 to freely spin relative to the remainder of mouse 100. Accordingly, by interacting with slider 120, a user may select between two different mechanical resistances for, and thus two different scroll speeds for, scroll wheel 102.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A mouse configured to communicatively couple to an information handling system, comprising:
   an enclosure;
   a scroll wheel enclosed within the enclosure, with a portion of the scroll wheel extending from the enclosure, the scroll wheel configured to rotate about a first rotational axis;
   a scroll wheel gear mechanically coupled to the scroll wheel and configured to rotate about the first rotational axis at the same angular velocity as the scroll wheel; and
   a damping gear assembly comprising:
      a damping gear enclosed with the enclosure and configured to rotate about a second rotational axis parallel to the first rotational axis of the scroll wheel; and
      a slider enclosed within the enclosure and exposed through an opening of the enclosure proximate to the portion of the scroll wheel which is exposed through the enclosure, the slider mechanically coupled to the damping gear to enable a user to selectively engage the damping gear to the scroll wheel gear and selectively disengage the damping gear from the scroll wheel gear by interacting with the slider, such that the damping gear inhibits rotation of the scroll wheel when the damping gear is engaged with the scroll wheel gear and such that the scroll wheel rotates freely when the damping gear is disengaged from the scroll wheel gear.

2. The mouse of claim 1, wherein the damping assembly further comprises:
   a gear box mechanically coupled to the damping gear; and
   a link bar mechanically coupled between the gear box and the slider.

3. The mouse of claim 2, wherein the damping assembly is constrained to move in a linear direction between a first position in which the damping gear is engaged with the scroll wheel gear and a second position in which the damping gear is disengaged from the scroll wheel gear.

4. The mouse of claim 1, wherein the damping gear is mechanically coupled to a mechanical encoder configured to inhibit rotation of the scroll wheel when the damping gear is engaged with the scroll wheel gear.

5. The mouse of claim 3, wherein the mechanical encoder is configured to provide tactile feedback to the scroll wheel via the damping gear and the scroll wheel gear.

6. The mouse of claim 1, further comprising:
a magnet mechanically coupled to the scroll wheel and configured to rotate about the first rotational axis at the same angular velocity as the scroll wheel; and
a magnetometer located proximate to the magnet and configured to:
sense rotational motion of the magnet; and
generate an electrical or electronic signal based on a rotational motion.

7. The mouse of claim 6, wherein the magnetometer comprises a Hall effect sensor.

8. A method comprising:
enclosing a scroll wheel within an enclosure of a mouse, with a portion of the scroll wheel extending from the enclosure and the scroll wheel configured to rotate about a first rotational axis;
mechanically coupling a scroll wheel gear to the scroll wheel and configured to rotate about the first rotational axis at the same angular velocity as the scroll wheel; and
enclosing a damping gear assembly within the enclosure, the damping gear assembly comprising:
a damping gear enclosed with the enclosure and configured to rotate about a second rotational axis parallel to the first rotational axis of the scroll wheel; and
a slider enclosed within the enclosure and exposed through an opening of the enclosure proximate to the portion of the scroll wheel which is exposed through the enclosure, the slider mechanically coupled to the damping gear to enable a user to selectively engage the damping gear to the scroll wheel gear and selectively disengage the damping gear from the scroll wheel gear by interacting with the slider, such that the damping gear inhibits rotation of the scroll wheel when the damping gear is engaged with the scroll wheel gear and such that the scroll wheel rotates freely when the damping gear is disengaged from the scroll wheel gear.

9. The method of claim 8, wherein the damping assembly further comprises:
a gear box mechanically coupled to the damping gear; and
a link bar mechanically coupled between the gear box and the slider.

10. The method of claim 9, further comprising constraining the damping assembly to move in a linear direction between a first position in which the damping gear is engaged with the scroll wheel gear and a second position in which the damping gear is disengaged from the scroll wheel gear.

11. The method of claim 8, further comprising mechanically coupling the damping gear to a mechanical encoder configured to inhibit rotation of the scroll wheel when the damping gear is engaged with the scroll wheel gear.

12. The method of claim 11, wherein the mechanical encoder is configured to provide tactile feedback to the scroll wheel via the damping gear and the scroll wheel gear.

13. The method of claim 8, further comprising:
mechanically coupling a magnet to the scroll wheel and configured to rotate about the first rotational axis at the same angular velocity as the scroll wheel; and
locating a magnetometer proximate to the magnet and configured to:
sense rotational motion of the magnet; and
generate an electrical or electronic signal based on a rotational motion.

14. The method of claim 13, wherein the magnetometer comprises a Hall effect sensor.

* * * * *